Sept. 4, 1962     W. A. R. KUNZE     3,052,243

ANCHOR TABS FOR HAIR CURLING AND WAVING DEVICE

Filed Oct. 26, 1959

INVENTOR.
WILLIAM A. ROGET KUNZE

BY

*ATTORNEY*

United States Patent Office 3,052,243
Patented Sept. 4, 1962

3,052,243
ANCHOR TABS FOR HAIR CURLING
AND WAVING DEVICE
William A. Roget Kunze, 54 Ocean Drive,
Miami Beach, Fla.
Filed Oct. 26, 1959, Ser. No. 848,570
1 Claim. (Cl. 132—42)

This invention relates to elastic gripping devices and more particularly to an elastic band having a handle thereon.

A principal object of the present invention is to provide an elastic gripping device suitable for holding a curl of hair on a curling and waving device and readily applied to and detached from the device.

Another object of the invention is to provide an elastic gripping device of this kind that is adapted to be made in various sizes with handles of various sizes and shapes.

A further object of the invention is to provide an elastic band with a handle thereon that is simple in construction, inexpensive to manufacture, and adapted for mass production, For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
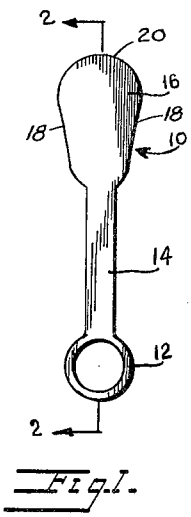
FIG. 1 is a plan view of an elastic gripping device embodying one form of the invention.
Figure 2:
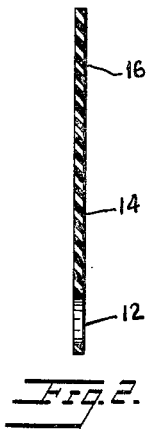
FIG. 2 is an edge view thereof.

Referring in detail to the drawings, in FIG. 1 a gripping device made in accordance with one form of the invention is shown and designated generally at 10. The gripping device 10 is formed of elastic material, preferably rubber, but may be formed of any other suitable elastic material. The gripping device is paddle-shaped and comprises an annular band 12 having a narrow, elongated, rectangular flat strip 14 extending laterally from the band 12. The strip terminates at its outer free end in an enlarged tab portion 16 which has tapered long side edges 18 and a round end 20.

The gripping device 10 may be readily made die molded, or injection molded or made by stamping.

Figure 5:
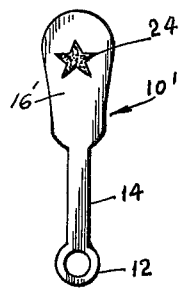
FIG. 5 is a top plan view of a modified form of gripping device.

In FIG. 5, a modified gripping device 10' is shown and differs from the form of FIGS. 1 to 4, inclusive, in that the surface of the cam portion 16' is roughened and formed with a medallion in the shape of a star 24 in base relief on one surface thereof to facilitate gripping the device and to ornament the same.

Figure 6:
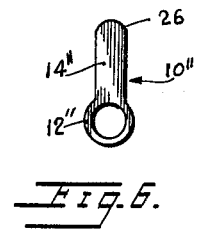
FIG. 6 is a top plan view of a further modified form of gripping device.

FIG. 6 shows another modified form of gripping device 10" having a laterally extending flat strip 14" with a round outer end 26. In this form, the tab portion 16 of device 10 is eliminated.

Figure 3:
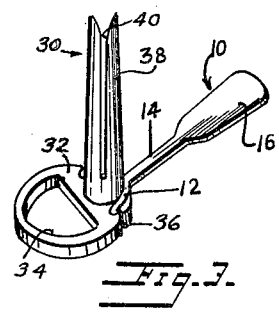
FIG. 3 is a perspective view showing the gripping device of FIG. 1 applied to a hair curler.
Figure 4:
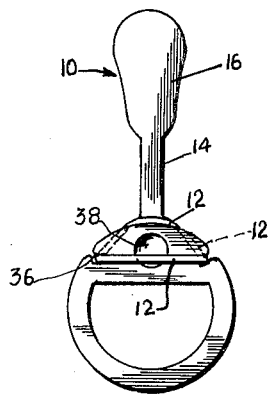
FIG. 4 is a bottom plan view of the parts of FIG. 3.

In practice, the gripping devices are suitable for use with hair curling and waving devices of the type shown in FIG. 3 and serve as anchoring tabs. In FIG. 3, the gripping device 10 is shown applied to the hair curling and waving device 30. The hair curling and waving device 30 comprises a flat circular base 32 with a cut-out portion 34 formed therein. The periphery of the base 32 is formed with opposed notches 36 and extending upwardly from the top surface of the base there is a post 38. The post is formed with a central slot 40 extending axially thereof from a point remote from the base to and intersecting the outer end of the post.

The gripping device 10 is adapted to be attached to the curler device by stretching the annular band 12 thereof and inserting the stretched band in the notches and around the material of the base between the notches and partly encircling the outer side of the post 38, leaving the flat strip 14 and tab portion 16 extending laterally of the curler device. After the strand of hair is curled upon the inner wide end of the post 38, the annular band 12 is again stretched by pulling on the tab portion 20 and the stretched band pulled outwardly of the free end of the post and then the pressure is released and the annular band snaps inwardly through the slot 40 in the post and onto the curl wound on the post, thereby firmly holding the curl in position on the post and at the same time firmly holding the curler onto the scalp.

In the form of gripping device 10" shown in FIG. 6, the annular band 12" is stretched by pulling on the handle 14" which is formed with a rounded end 26.

Figure 7:
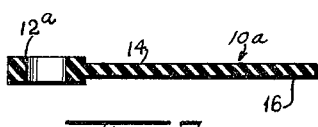
FIG. 7 is a view similar to FIG. 2 of still another modification of the invention.

The gripping device 10ª shown in FIG. 7 differs from the form shown in FIGS. 1 to 4, inclusive, in that the annular band 12ª is thicker than the remainder of the device in order to prevent tearing of the device in use.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A hair curler comprising a hair receiving slotted post, a circular base supporting the post, said base having opposed notches in the periphery thereof, said post being located off-center on the base and immediately adjacent said notches, and elastic one-piece flat hair gripping device including an annular elastic band extending through the notches and across the base therebetween, the length of the post being such that the elastic band is under tension longitudinally of the post when it is swung into curl locking position in the slot of the post, an integral narrow extension radially of the band and a tab portion integral with the extension on the outer end thereof for stretching the annular elastic band.

References Cited in the file of this patent

UNITED STATES PATENTS

| | | |
|---|---|---|
| 2,404,517 | Molchan | July 23, 1946 |
| 2,608,978 | Solomon | Sept. 2, 1952 |
| 2,793,645 | Grant | May 28, 1957 |
| 2,832,356 | Reed | Apr. 29, 1958 |